United States Patent Office.

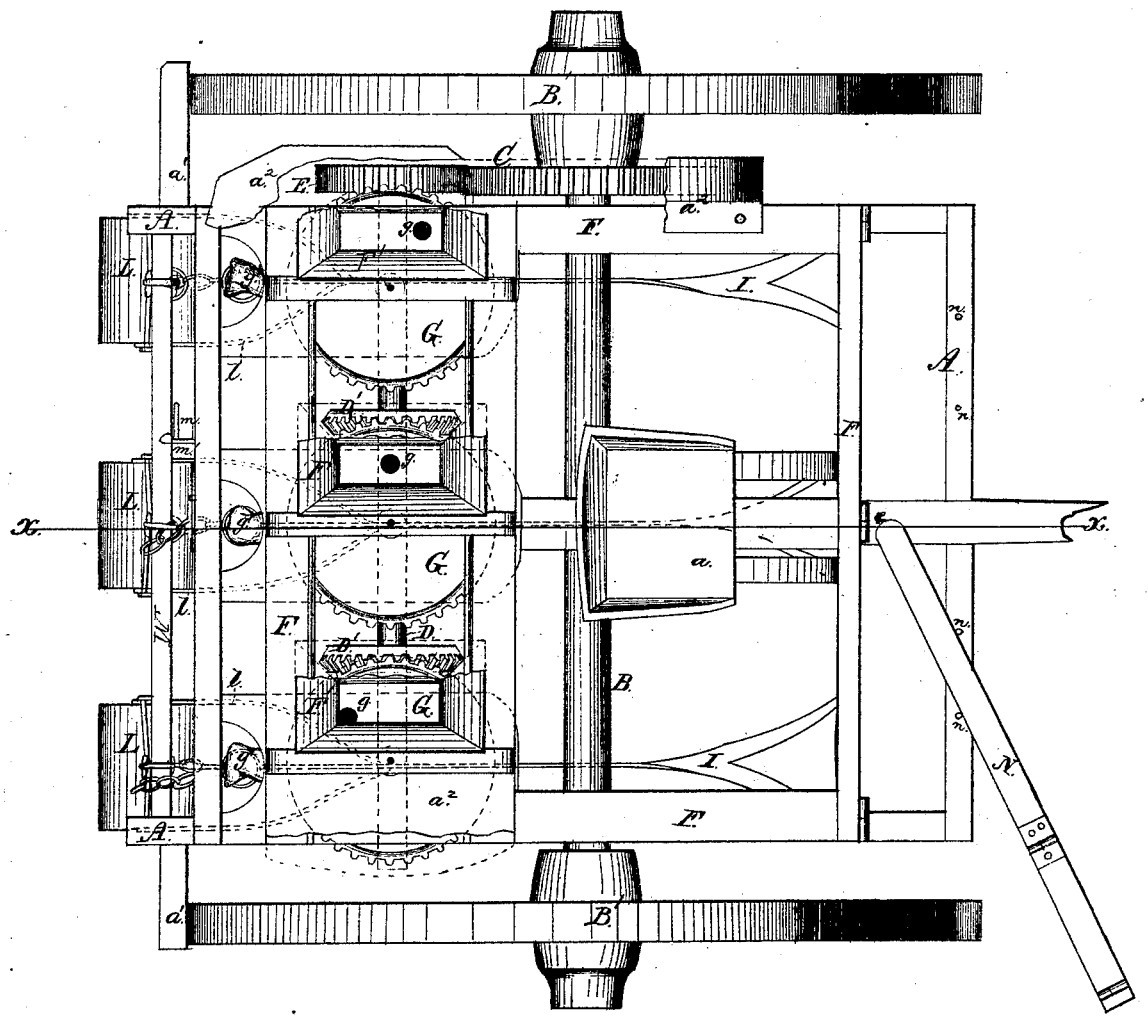

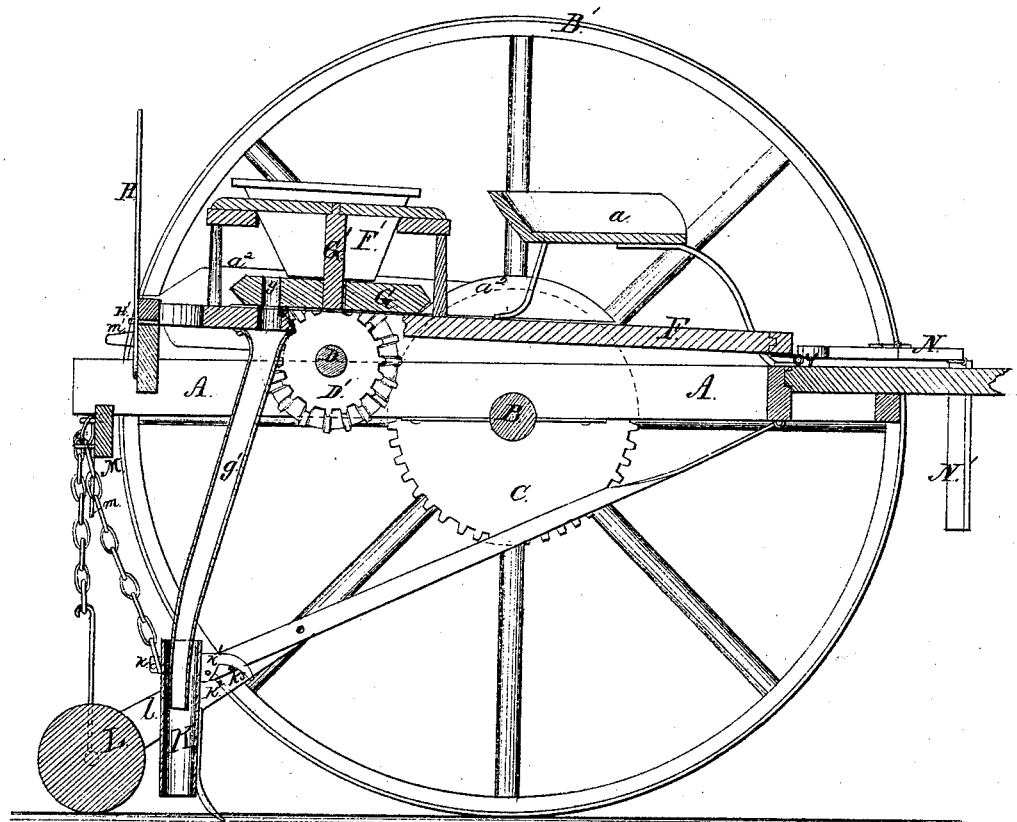
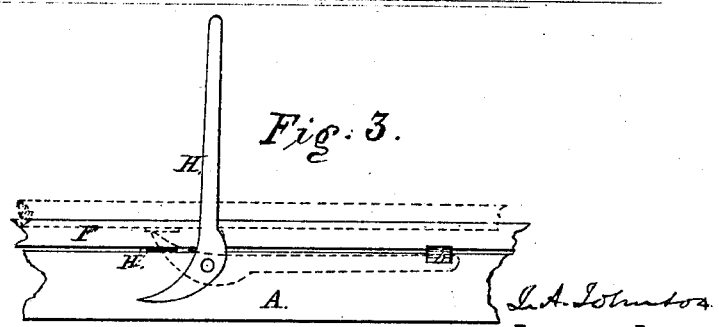

JAMES A. JOHNSON, OF PENDLETON, INDIANA.

Letters Patent No. 94,417, dated August 31, 1869.

IMPROVEMENT IN CORN-PLANTER.

The Schedule referred to in these Letters Patent and making part of the same.

*To all whom it may concern:*

Be it known that I, JAMES A. JOHNSON, of Pendleton, Madison county, Indiana, have invented a new and useful Improvement in Corn-Planters; and I do hereby declare that the following is a full and exact description thereof, reference being had to the accompanying drawings, and to the letters of reference marked thereon.

Figure 1 is a plan view of the machine;

Figure 2, a sectional elevation on-line $x\ x$ of fig. 1; and

Figure 3 is a rear elevation or portion of the machine, showing the lever by which the hinged frame may be raised.

The same letters denote like parts in the several figures.

My invention relates to corn-planters; and

My improvement consists in the combination and arrangement of the supporting-frame of the machine and a hinged frame, carrying the seed-boxes and bevel-wheels for dropping the corn, as hereinafter more fully described.

To enable those skilled in the art to make and use my invention, I will proceed to describe its construction and operation.

A, in the drawings, represents the frame, consisting of longitudinal and transverse bars, of the necessary strength, and firmly secured together. To the front end the tongue or shafts are to be attached. I usually construct this frame of sufficient width to carry three seed-boxes, so as to plant three rows of corn at a time.

A seat, $a$, for the operator, is conveniently mounted upon the frame.

$a^1\ a^1$ are scrapers fastened to the frame directly in rear of the wheels, which they are designed to clear of any mud or clods hanging to them.

$a^2$ are pieces of sheet-metal covering the gearing next to the wheels, and serving as fenders against clods and grit.

B represents the axle upon which the frame is mounted, having upon its ends the wheels B', one of which is keyed to it.

C is a spur-wheel fastened on the axle, which drives the pinion E as the machine is driven along.

D is a transverse horizontal shaft, having its bearings in the frame in rear of the axle B, and at such distance therefrom that the spur-wheel C shall mesh into the pinion E, which is to be secured to one end of this shaft in line with the driving-wheel.

D' are bevel-wheels, keyed at the proper points to the shaft D, which drive the horizontal bevel-wheels G, soon to be described.

E is the pinion above alluded to. The inside portion of its teeth is to be constructed in such a manner as to be capable of driving one of the horizontal bevel-wheels.

F represents the hinged frame, which is pivoted to a transverse bar of the supporting-frame in front thereof, as shown in fig. 2.

The rear portion of this hinged frame is suitably constructed for the reception of the seed-boxes F', which are to be placed at equal distances apart.

G represents horizontal bevel-wheels, which are secured to vertical spindles G', which are pivoted in the hinged frame.

These bevel-wheels form the bottom of the seed-boxes, and are provided each with a hole, $g$, which is filled with corn as, in the revolution of the wheel, it is brought under the respective seed-box, and delivers the corn through a hole in the hinged frame into flexible conductors $g'$, from which it falls through the hollow drill into the furrow.

H represents a lever, which is to be pivoted to the main frame.

By reference to fig. 3 it will be seen that, by turning down the long arm of this lever, its short arm catches under a projection, H', of the hinged frame, raising the rear end thereof sufficiently to throw the seed-wheels out of gear. As the lever is turned down it hooks under a catch, $h$, of the main frame.

I represents the drag-bars, the forward ends of which are pivoted to a transverse bar of the frame in any suitable manner, and extending backward, have attached to them the drill-teeth and coverers.

K represents the hollow drill-teeth, which may be of any approved style. The upper end of them is provided with lugs $k$ and $k^1$; by the latter, which are forked, they are pivoted to the drag-bars, by pins $k^2$, while the elongated ends lay on a wooden stop, $k^3$, passing through the drag-bar, holding the tooth in the proper upright position. If the tooth should run against a stump or other obstruction, this fragile wooden pin will break, and allow the tooth to swing back, thus preventing injury to the more expensive parts.

To the lug $k$ a chain is attached, which, passing upward, hooks over a catch on a revolving transverse bar, $m$, in the rear end of the frame.

L represents the covering-rollers, which are pivoted to the drag-bars by the forked arms $l$, and also attached, by means of chains, to the revolving bar M.

M represents the revolving bar just mentioned, which has its bearings in the rear end of the frame. At the proper points it is provided with pins, on which the chains of the drill-teeth and coverers are hooked.

By reference to fig. 2 it will be seen that, as this bar is turned in the direction indicated by the dotted outline, it will wind upon it these chains, and raise the drill-teeth and coverers from the ground. It is provided with a lever, $m$, which, when in its elevated position, is held by the catch $m'$ secured to the frame.

This corn-planter is designed to perform the work without previously marking off the field. To this end, I employ a guide or gauge-rod, N, attached to the forward end of the machine in any convenient manner, and, extending outward laterally the proper distance, has a pendant portion, N', which, in planting, is to hang over the antecedent row. It is to be so attached that it can be changed from one side to the other. Stops n n hold it in position.

Having thus described my invention,

What I claim, and desire to secure by Letters Patent, is—

1. The combination and arrangement of the supporting-frame A and hinged frame F, carrying the seed-boxes and bevel-wheels, for dropping the corn, substantially as shown and described.

2. The combination of the hinged frame F with the seed-boxes F' and seed-wheels G, substantially as described.

3. The combination of the hinged frame F with the flexible tubes g' and drill-teeth K, substantially as shown and described.

In testimony whereof, I have signed my name to this specification, in the presence of two subscribing witnesses.

JAMES A. JOHNSON.

Witnesses:
J. M. SATTERTHWAIT,
WM. WHITFORD.